US010100733B2

(12) United States Patent
O'Toole et al.

(10) Patent No.: US 10,100,733 B2
(45) Date of Patent: Oct. 16, 2018

(54) TURBINE ENGINE WITH ANTI-ICE VALVE ASSEMBLY, BLEED AIR VALVE, AND METHOD OF OPERATING

(71) Applicant: GE Aviation Systems LLC, Grand Rapids, MI (US)

(72) Inventors: Michael Timothy O'Toole, Hanover Park, IL (US); Kevin Harold Coates, Rockford, IL (US); Michael Robert Wackett, Beloit, WI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 132 days.

(21) Appl. No.: 14/814,656

(22) Filed: Jul. 31, 2015

(65) Prior Publication Data

US 2017/0030265 A1 Feb. 2, 2017

(51) Int. Cl.
*F02C 7/047* (2006.01)
*F02C 3/04* (2006.01)
(Continued)

(52) U.S. Cl.
CPC .............. *F02C 7/047* (2013.01); *B64D 13/08* (2013.01); *B64D 15/04* (2013.01); *F01D 17/145* (2013.01); *F01D 25/02* (2013.01); *F01D 25/12* (2013.01); *F02C 3/04* (2013.01); *F02C 6/04* (2013.01); *F02C 6/08* (2013.01); *F02C 7/14* (2013.01);
(Continued)

(58) Field of Classification Search
CPC .... F02C 7/047; F02C 7/04; F02C 3/04; F02C 7/14; F02C 7/42; F02C 9/18; F02C 6/04; F02C 6/047; F02C 6/08; F02C 7/18; F02C 7/141; B64D 13/08; B64D 2033/0233; B64D 15/04; B23K 1/0008; F16K 1/32; F28D 15/02; F01D 17/145; F01D 25/02; F05D 2220/32; F05D 2260/213; F05D 2260/57
See application file for complete search history.

(56) References Cited

U.S. PATENT DOCUMENTS 2,647,366 A * 8/1953 McCann .................. F02C 7/047
415/115
3,834,157 A * 9/1974 Hoffmann ............... F02C 7/047
165/87

(Continued)

OTHER PUBLICATIONS

A PCT Search Report and Written Opinion issued in connection with corresponding PCT Application No. PCT/US2016/043244 dated Oct. 25, 2016.

(Continued)

*Primary Examiner* — Gerald L Sung
*Assistant Examiner* — Marc Amar
(74) *Attorney, Agent, or Firm* — GE Aviation Systems LLC; William Scott Andes

(57) ABSTRACT

An anti-ice valve, a turbine engine including an anti-ice valve assembly and a method of operating an anti-ice valve where an anti-ice valve has a housing and a valve element configured to control a flow of hot bleed air through the housing, and a muscle air passage extending through the housing, a cooling air passage extending through the housing, and a heat exchanger located within the housing and having heat transfer surfaces in thermal communication with the muscle air passage and the cooling air passage.

19 Claims, 6 Drawing Sheets

(51) Int. Cl.
*F02C 9/18* (2006.01)
*F02C 6/08* (2006.01)
*F02C 7/18* (2006.01)
*B64D 13/08* (2006.01)
*F02C 7/141* (2006.01)
*B64D 15/04* (2006.01)
*F02C 6/04* (2006.01)
*F01D 17/14* (2006.01)
*F01D 25/02* (2006.01)
*F01D 25/12* (2006.01)
*F02C 7/14* (2006.01)
*F02C 7/32* (2006.01)
*B64D 33/02* (2006.01)

(52) U.S. Cl.
CPC ............... *F02C 7/141* (2013.01); *F02C 7/18* (2013.01); *F02C 7/32* (2013.01); *F02C 9/18* (2013.01); *B64D 2033/0233* (2013.01); *F05D 2220/32* (2013.01); *F05D 2260/213* (2013.01); *F05D 2260/57* (2013.01); *Y02T 50/671* (2013.01); *Y02T 50/675* (2013.01)

(56) References Cited

U.S. PATENT DOCUMENTS

| | | | | |
|---|---|---|---|---|
| 3,981,466 A * | 9/1976 | Shah | ...................... | B64D 15/02 165/42 |
| 5,083,423 A * | 1/1992 | Prochaska | ................. | F02C 7/04 60/772 |
| 5,267,608 A * | 12/1993 | Coffinberry | ............ | B01J 19/002 165/104.14 |
| 5,441,716 A * | 8/1995 | Rockenfeller | ......... | B01D 53/34 422/107 |
| 6,058,725 A | 5/2000 | Monfraix et al. | | |
| 2008/0230651 A1* | 9/2008 | Porte | ...................... | B64D 13/06 244/118.5 |
| 2009/0078828 A1* | 3/2009 | Sugai | .................... | B23K 1/0008 244/134 B |
| 2010/0001138 A1 | 1/2010 | Dasilva et al. | | |
| 2010/0021360 A1* | 1/2010 | Leenders | ........... | B01D 53/8675 423/219 |
| 2012/0048509 A1 | 3/2012 | Weber | | |
| 2012/0180501 A1* | 7/2012 | Army | ..................... | B64D 13/08 60/796 |
| 2014/0230869 A1* | 8/2014 | Chen | ...................... | H01L 35/30 136/201 |
| 2014/0245749 A1 | 9/2014 | Mercier et al. | | |
| 2015/0369372 A1* | 12/2015 | Hrdlichka | ............... | F01D 25/02 137/334 |
| 2016/0208694 A1* | 7/2016 | Simpson | .................. | F16K 31/1635 |
| 2016/0369698 A1* | 12/2016 | Army, Jr. | ................. | F02C 7/185 |

OTHER PUBLICATIONS

A PCT IPRP issued in connection with corresponding PCT Application No. PCT/US2016/043244 dated Feb. 15, 2018.

* cited by examiner

TURBINE ENGINE WITH ANTI-ICE VALVE ASSEMBLY, BLEED AIR VALVE, AND METHOD OF OPERATING

BACKGROUND OF THE INVENTION

Gas turbine engines typically include a fan delivering air into a bypass duct defined within a nacelle, and also into an engine core. The air in the engine core passes through a compressor section, and then into a combustion section. In the combustion section the air is mixed with fuel and ignited, and products of this combustion pass downstream over turbine rotors.

The formation of ice on aircraft structures, for example engine inlets, wings, control surfaces, propellers, booster inlet vanes, inlet frames, etc., is a problem for contemporary aircraft. Ice adds weight, increases drag, and alters the aerodynamic contour of airfoils, control surfaces and inlets, all of which reduce performance and consequently increase the fuel consumption of a gas turbine engine. In addition, ice permitted to form on aircraft structures can become dislodged and impact other aircraft parts and engine components, causing damage.

Contemporary aircraft can include systems that take hot air from the engines of the aircraft for use within the aircraft; for example, a nacelle anti-icing system can use hot air from the engines to heat portions of the nacelle inlet. The nacelle anti-icing system typically will tap hot air from the compressor section and selectively deliver it to the inlet of the nacelle to provide anti-icing at the lip of the nacelle. This anti-icing function is performed selectively and when conditions indicate that there can be icing at the lip of the nacelle, the valve can be opened to deliver the hot air to that location.

BRIEF DESCRIPTION OF THE INVENTION

In one aspect, an embodiment of the invention relates to a bleed air valve assembly including a bleed air valve having a housing and a valve element configured to control a flow of hot bleed air through the housing, and a muscle air passage extending through the housing, a cooling air passage extending through the housing, and a heat exchanger located within the housing and having heat transfer surfaces in thermal communication with the muscle air passage and the cooling air passage and wherein heat is transferred from muscle air within the muscle air passage to cooling air in the cooling air passage by the heat transfer surfaces to effect a cooling of the muscle air and define a lower temperature muscle air stream.

In another aspect, an embodiment of the invention relates to a gas turbine engine including an engine core having an inner housing containing a fan assembly, a compressor section, a combustion section, and a turbine section, a nacelle anti-icing system configured to tap compressed air from the engine core to a portion of the nacelle to define a flow of hot bleed air, and an anti-ice valve assembly comprising a valve element housing defining a flow path, a valve element disposed in the flow path configured to control the flow of hot bleed air to the nacelle, and a servo controller comprising a servo housing, a muscle air passage extending through the housing and fluidly coupled to the flow of hot bleed air, a cooling air passage extending through the housing and a heat exchanger located within the servo housing, and having heat transfer surfaces in thermal communication with the muscle air passage and the cooling air passage and wherein heat is transferred from muscle air within the muscle air passage to cooling air in the cooling air passage by the heat transfer surfaces to effect a cooling of the muscle air and define a lower temperature muscle air stream.

In yet another aspect, an embodiment of the invention relates to a method of operating an anti-ice valve, including supplying a flow of hot compressed air to the anti-ice valve, diverting a portion of the flow of hot compressed air to form a flow of muscle air, and passing the flow of muscle air through a compact heat exchanger having dense finned surfaces located within a servo housing of the anti-ice valve while supplying cooling air to a portion of the compact heat exchanger that is fluidly separate from the flow of muscle air to extract heat from the flow of muscle air to define a flow of cooled muscle air.

DESCRIPTION OF EMBODIMENTS OF THE INVENTION

Embodiments of the invention relate to a bleed air valve and gas turbine engine incorporating a bleed air valve in the form of a nacelle anti-ice (NAI) valve that includes a heat exchanger integrated within the structure of the valve to cool hot extracted bleed air in the form of muscle air supplied to the valve. While the remainder of the specification discusses the inventive embodiments with respect to an anti-ice valve it will be understood that embodiments of the invention can be utilized in any bleed air valve assembly utilizing high temperature muscle air. Muscle air is a fraction of the bleed air flow which is provided to the anti-ice valve to provide internal functions within the anti-ice valve. This muscle air must be significantly cooled before being brought into the anti-ice valve as it can be supplied at temperatures of up to 1000° F. Supplying the muscle air at such high temperatures can result in undesirable heating of internal components of the anti-ice valve including, but not limited to, O-rings, seals including elastomeric seals, diaphragms, etc., which would result in damage to such internal components.

It will be understood that the term "anti-icing" refers to the prevention of the formation of ice in the first place whereas the term "de-icing" refers to the reduction, or elimination, of ice after it has begun to form. It will be understood that although the term "anti-icing" is consistently used throughout, embodiments of invention are not to be so limited, but are applicable to "de-icing" systems as well.

Figure 1:
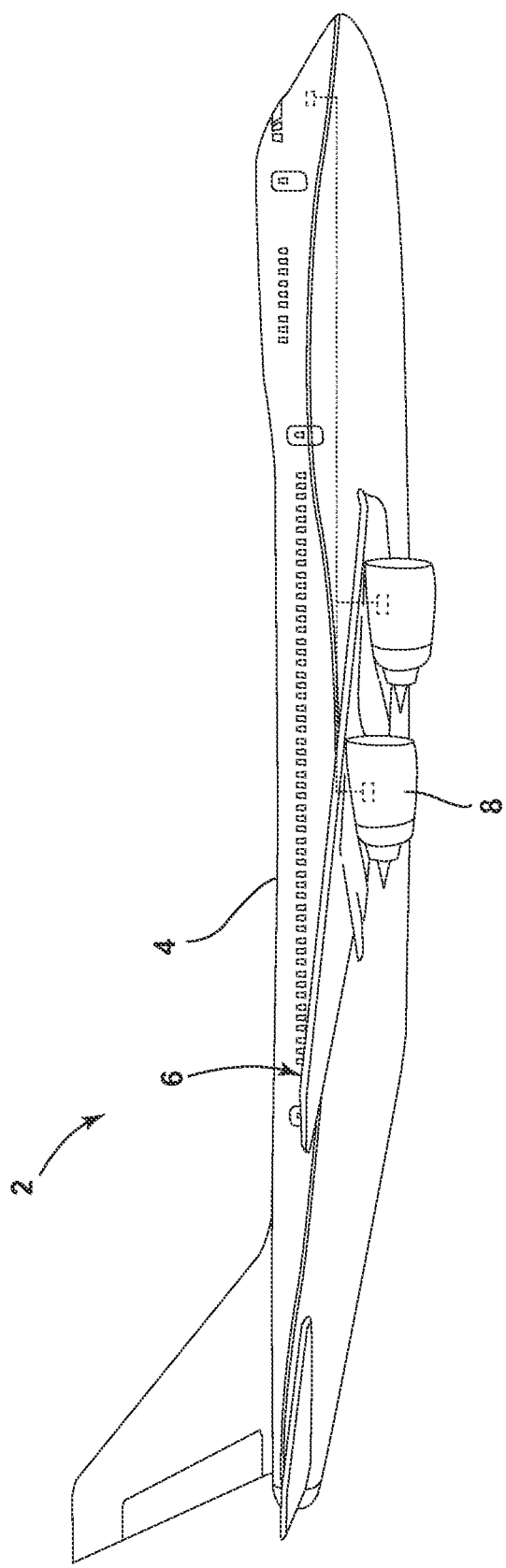
FIG. 1 is a side view of an aircraft with multiple turbine engine assemblies.

FIG. 1 illustrates an aircraft 2 having a fuselage 4 with wing assemblies 6 extending outward from the fuselage 4.

One or more turbine engine assemblies 8 can be coupled to the aircraft 2 to provide propulsion therefore. While a commercial aircraft 2 has been illustrated, it is contemplated that embodiments of the invention can be used in any type of aircraft, for example, without limitation, personal aircraft, business aircraft, and military aircraft.

Figure 2:
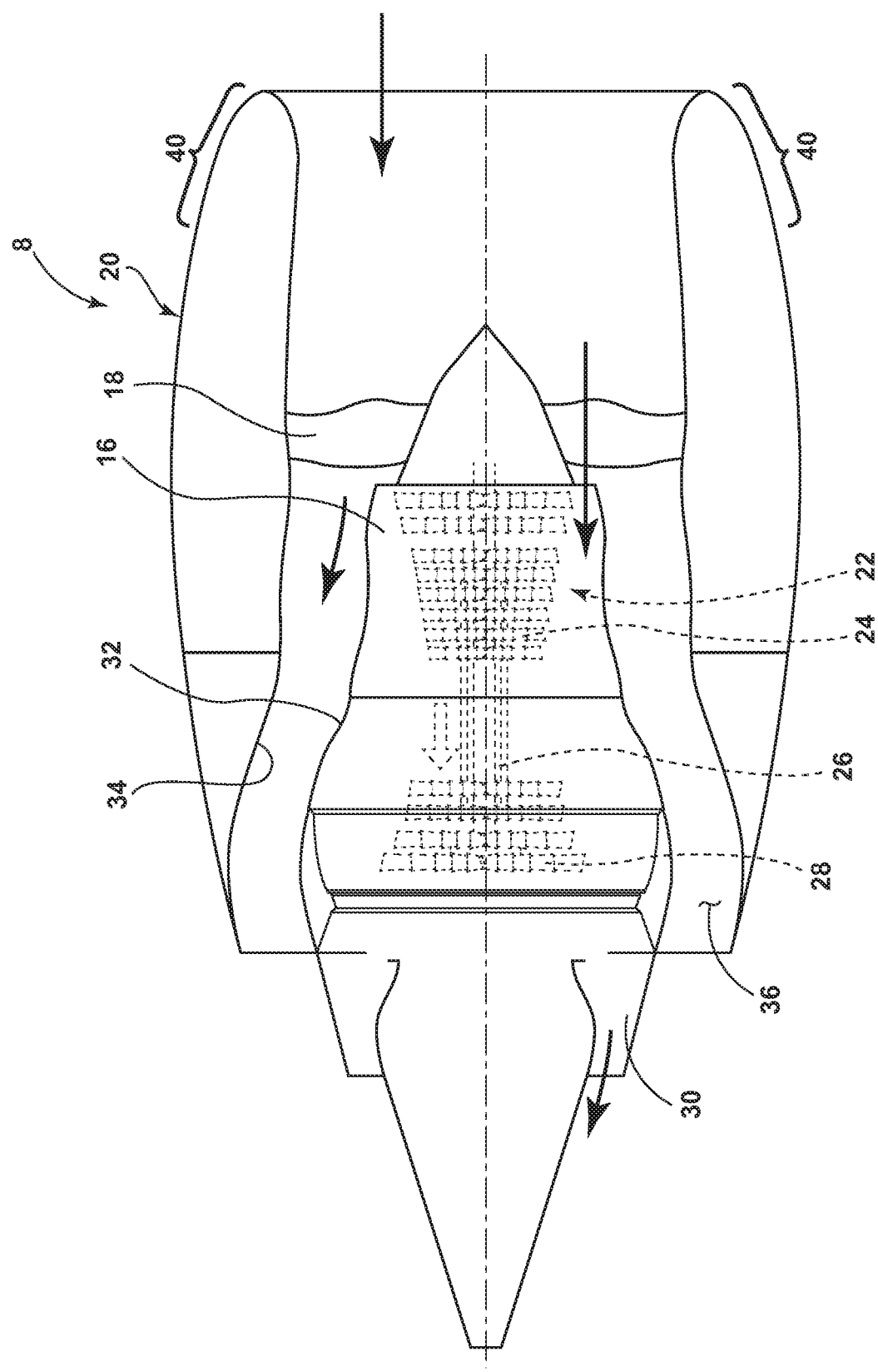
FIG. 2 is a schematic partially cut away view of a turbine engine assembly, which can be included in the aircraft of FIG. 1.

As illustrated more clearly in FIG. 2, each turbine engine assembly 8 can include a turbine engine 16, a fan assembly 18, and a nacelle 20. The turbine engine 16 includes an engine core 22 having compressor(s) 24, which can include both low and high pressure compressors, combustion section 26, turbine section(s) 28, and exhaust 30. An inner housing or inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path.

Figure 3:
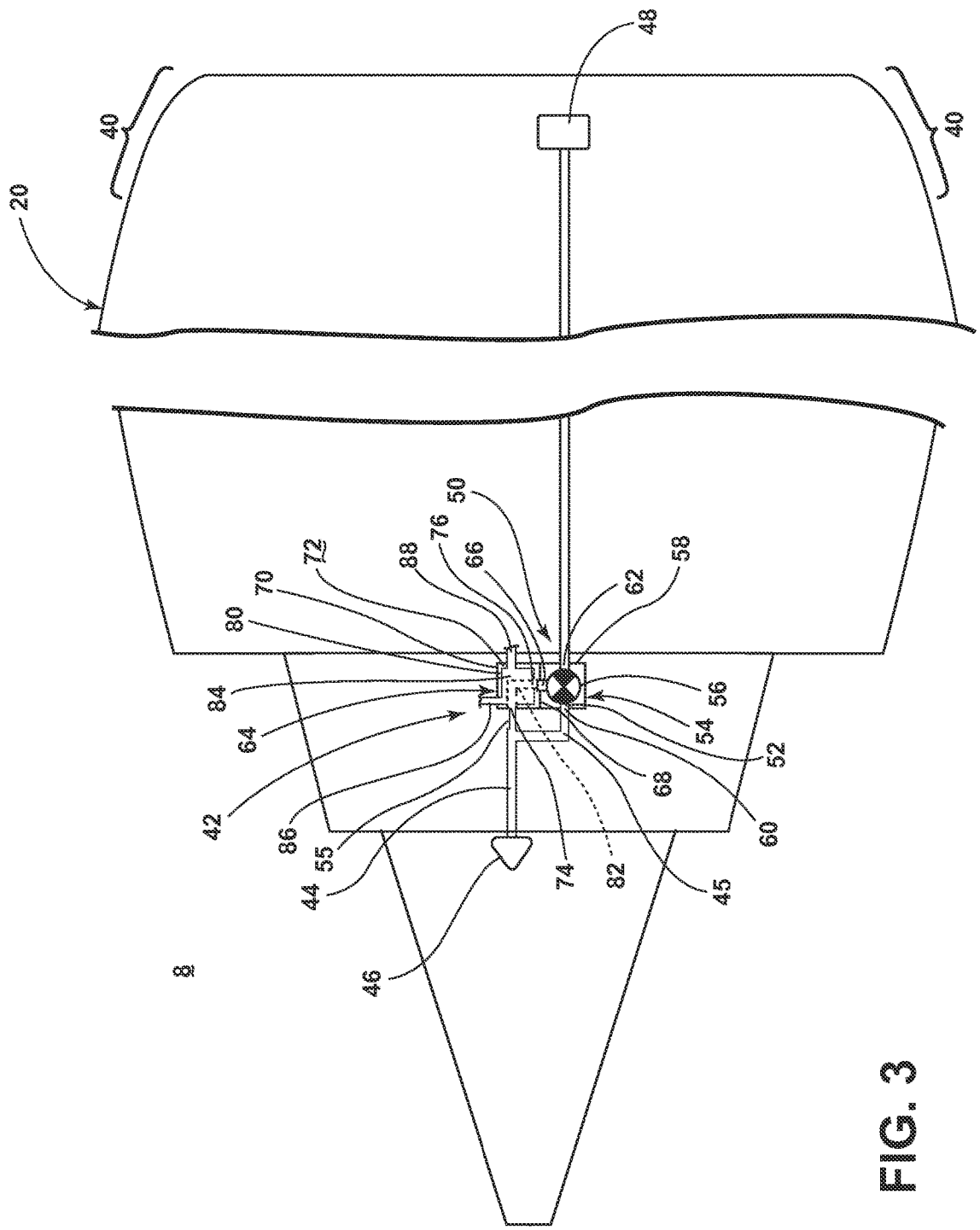
FIG. 3 is a schematic view of an exterior of the engine assembly of FIG. 2 with a nacelle anti-ice system according to an embodiment of the invention.

The outer cowl 34 has an inlet or forward portion 40. During some flight conditions, water droplets typically impinge on forward portion 40. As schematically illustrated in FIG. 3, a NAI assembly or NAI system 42 can be included in the turbine engine assembly 8 and can be configured to inhibit the water droplets from forming into ice. More specifically, the NAI system 42 can direct hot air to the forward portion 40 generally impinged by water droplets. While a NAI valve and system has been illustrated, it is contemplated that embodiments of the invention can be used in any type of anti-ice valve.

As an example, a conduit 44 can be included in the NAI system 42 and coupled to a portion of the turbine engine assembly 8 to extract a portion of the hot, compressed air from the engine core 22 (FIG. 2) of the turbine engine assembly 8. Such hot compressed air is commonly referred to as bleed air. The bleed air can be acquired, received or otherwise tapped from a bleed-air port 46 at any suitable portion of the engine core 22 including, but not limited to, one of the compressor section(s) 24 (FIG. 2) or one of the turbine section(s) 28 (FIG. 2). The conduit 44 diverts the hot gas to the suitable portion of the forward portion 40 to protect the forward portion 40 from ice formation. A nozzle 48 can be included at the forward portion 40 to direct the hot gas to any suitable portions of the forward portion 40.

An anti-ice valve assembly 50 can be operably coupled to the conduit 44, including through an optional branch 45, such that the NAI valve assembly 50 can control the flow of hot bleed air to the forward portion 40. A flow path 52 for the bleed air extends through the body of an anti-ice valve 54. More specifically, the flow path 52 extends through a housing 58 of the anti-ice valve 54 from a bleed air inlet 60 to a bleed air outlet 62.

The NAI valve assembly 50 is configured to receive the high temperature, pressurized bleed air from the engine core 22 before it is used for anti-icing. Typically, the anti-ice valve 54 would not be left open at all times, as that would reduce the efficiency of the turbine engine assembly 8. A valve element 56 is disposed in the flow path 52 to control the flow of bleed air to be supplied to the forward portion 40. The valve element 56 can be operably coupled to a pneumatic servo controller 64 that controls the valve element 56 and regulates the pressure of the bleed air through the flow path 52. By way of non-limiting example, a valve actuator 66, which is pneumatically operated by the pneumatic servo controller 64, can be operably coupled to the valve element 56 to control its operation and regulate the bleed air through the flow path 52. In this manner both the anti-ice valve 54 and its corresponding pneumatic servo controller 64 are included in the NAI valve assembly 50. The anti-ice valve 54 and the pneumatic servo controller 64 can be spaced a predetermined distance apart from each other including, but not limited to, that they can be separated from each other by an optional barrier 68. Alternatively, the valve actuator 66 can be electrically operated.

The pneumatic servo controller 64 receives a portion of the bleed air from one or more tubes or conduits 55 that communicate with the flow path 52 or with the conduit 44 upstream of the flow path 52. The pneumatic servo controller 64 can include, among other things, a servo housing 70 defining a cavity 72 and having a muscle air inlet 74 fluidly coupled to the conduit(s) 55 and a muscle air outlet 76 providing muscle air to control operation(s) of the anti-ice valve 54. A muscle air passage 82 is defined between the muscle air inlet 74 and the muscle air outlet 76. It will be understood that the muscle air passage 82 can be formed in any suitable manner including, but not limited to, that the muscle air passage 82 can include a fluidly separate portion of the servo housing 70 or can include one or more structural passages. Regardless of the manner formed the muscle air passage 82 forms a muscle air circuit for the muscle air to pass through.

A cooling air passage 84 extends through the servo housing 70 from a cooling air inlet 86 to a cooling air outlet 88. It will be understood that the cooling air passage 84 can be formed in any suitable manner including, but not limited to, that the cooling air passage 84 can merely include a fluidly separate portion of the servo housing 70 or can include one or more structural passages. Regardless of the manner formed the cooling air passage 84 forms a cooling air circuit for cooling air to pass through. The cooling air can be obtained from any suitable air flow including a cooling duct off the fan assembly of the turbine engine assembly 8. The cooling air can be provided at any suitable temperature including, but not limited to, at a temperature that is lower than the ambient air in the nacelle 20. The difference in temperatures between the cooling air and hot muscle air provides the necessary thermodynamic potential to allow heat transfer to occur between the two fluids. The lower the coolant temperature, the greater the realized effectiveness of the cooling process.

Further, the pneumatic servo controller 64 can include portions that are configured to control regulation of the remainder of the NAI valve assembly 50. Such portions will not be described further herein as the pneumatic servo controller 64 can operate in any suitable manner including that it can allow or restrict passage of the hot bleed air through the flow path 52 based on pressures within the NAI valve assembly 50.

Figure 4:
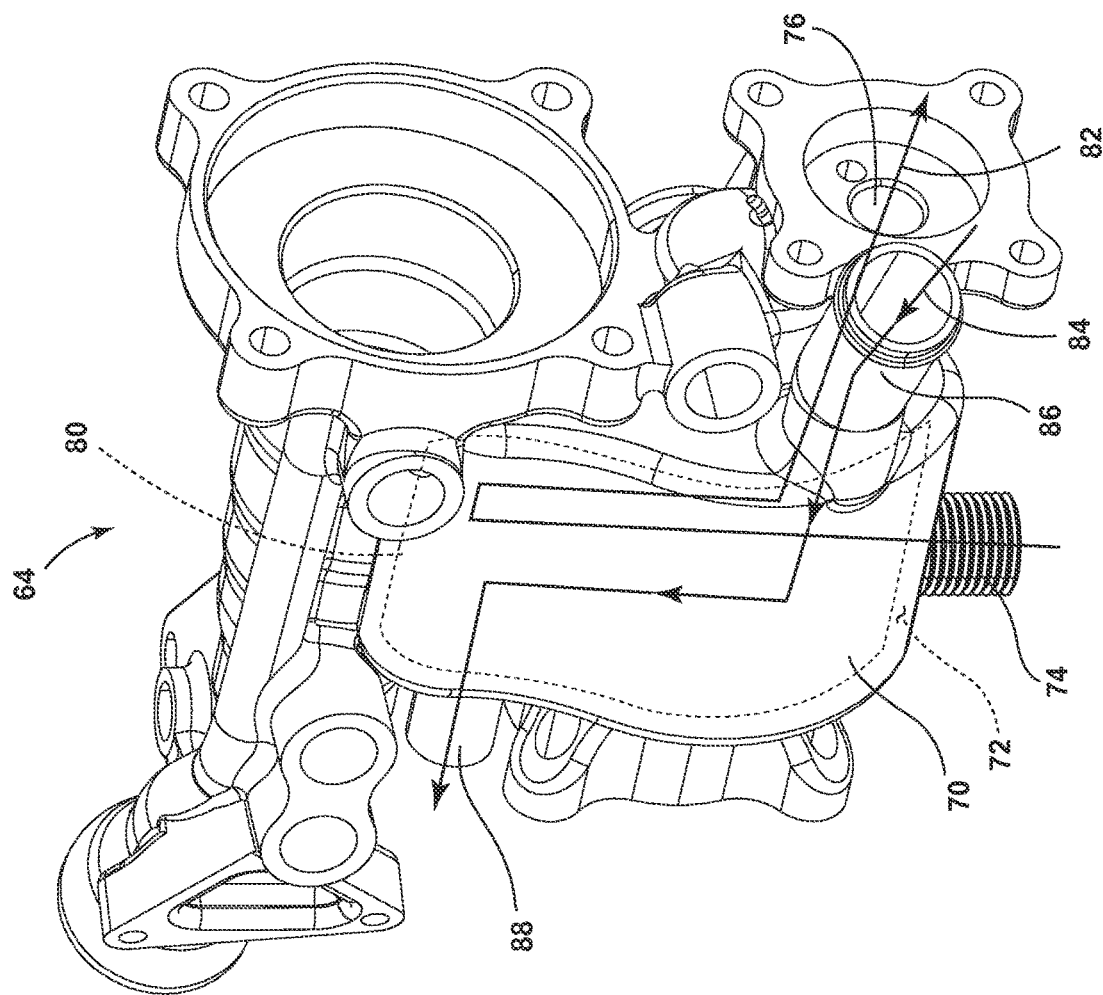
FIG. 4 is a perspective view of a portion of an anti-ice valve that can be included in the system of FIG. 3.
Figure 5:
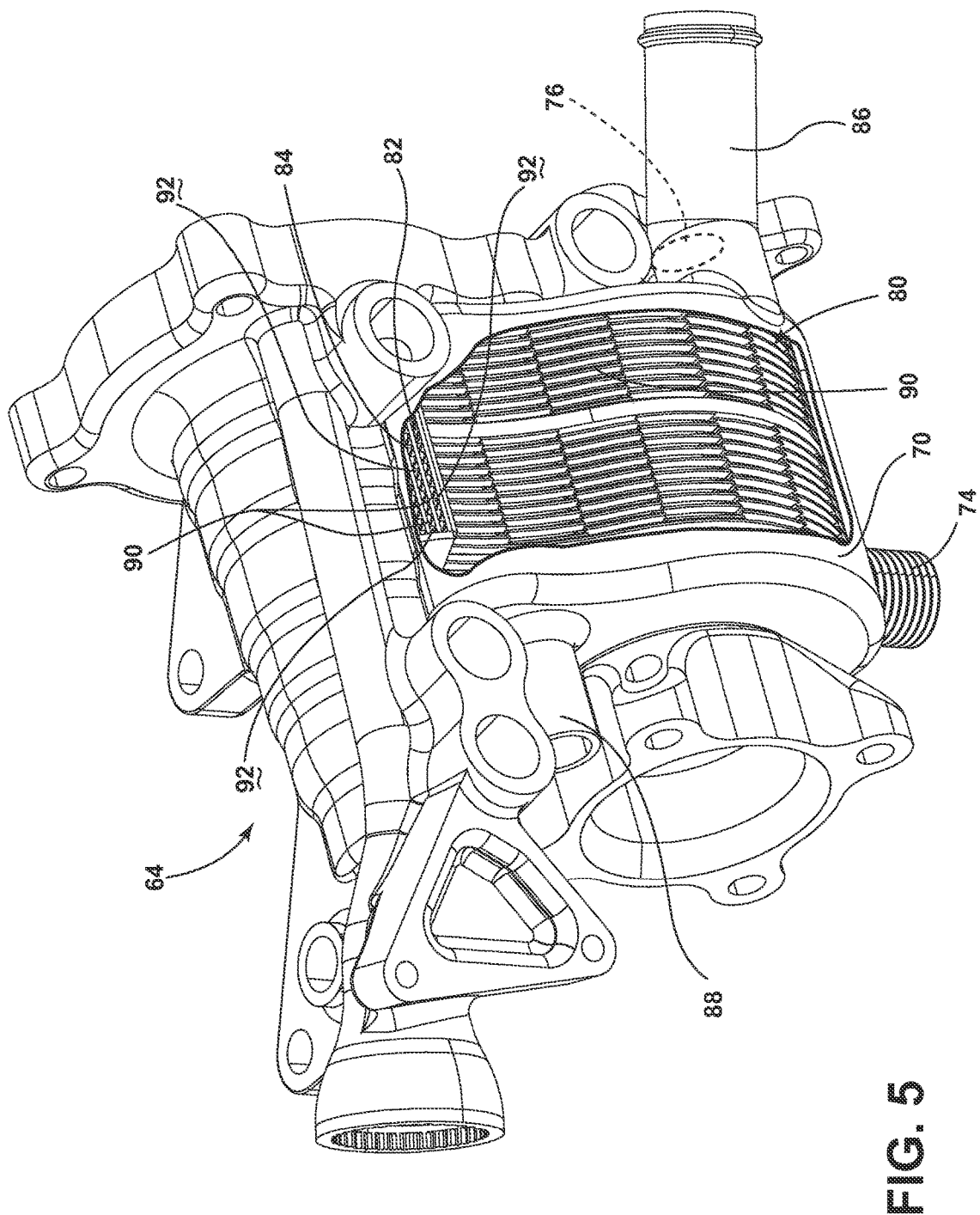
FIG. 5 is a partially cut away perspective view of the portion of the anti-ice valve of FIG. 4 illustrating a heat exchanger within the anti-ice valve.

The muscle air received at the muscle air inlet 74 can be at temperatures of up to 1000° F., which could be harmful to the remainder of the NAI valve assembly 50. Referring to FIG. 4, a compact heat exchanger 80 can be included within the cavity 72 of the servo housing 70 and can have heat transfer surfaces 90 (FIG. 5). The heat exchanger 80 can be configured to cool the flow of muscle air within the heat exchanger 80, which is schematically illustrated with an arrow as the muscle air passage 82. While, the muscle air passage 82 is fluidly separate from the cooling air passage 84, the heat transfer surfaces 90 (FIG. 5) can be in thermal communication with both the muscle air passage 82 and the cooling air passage 84. In this manner, heat can be transferred from muscle air within the muscle air passage 82 to cooling air in the cooling air passage 84 by the heat transfer surfaces 90. Heat is transferred via convection and conduction in this manner.

In this manner, the heat exchanger 80 having the heat transfer surfaces 90 is located within a portion of the NAI valve assembly 50. It will be understood that a variety of suitable heat exchangers can be utilized within the NAI valve assembly 50, depending upon the desired thermal performance and allowable pressure drops. By way of non-limiting example, the heat exchanger 80 in FIG. 5 is illustrated as a compact heat exchanger having dense finned surfaces. It will be understood that the muscle air passage 82 and the cooling air passage 84 can be different portions of the housing interior separated by a heat transfer surface 90. Alternatively, a series of internal flow passages 92 create the heat transfer surfaces 90 of the heat exchanger 80 and define both the muscle air passages 82 and the cooling air passages 84. It will be understood that while the heat exchanger 80 has been described as including dense finned surfaces that such is not required. If fins are utilized, the fins can be shaped or formed in any suitable manner including, but not limited to, that plain folded fins, lanced folded fins, or herringbone fin designs can be utilized. It will be understood that the shape, size, formation, etc., of the extended surfaces including, but not limited to, fin pitch, wall thickness, and passage height can be changed to obtain a desired cooling and pressure drop performance. Further, the heat exchanger 80 can be a multi-pass heat exchanger wherein either or both the cooling fluid and the muscle air can have two or more passes to achieve a desired convection performance and pressure drop constraints.

It is contemplated that the heat exchanger 80 can be formed as a single piece component fabricated with additive manufacturing methods. By way of non-limiting example, additive manufacturing methods can include 3-D printing. In such an instance it is also contemplated that the heat exchanger 80 can be integrally formed with the servo housing 70. Alternatively, the heat exchanger 80 can be formed utilizing conventional methods including, but not limited to, brazing or welding and the heat exchanger 80 can be mounted or oriented within the servo housing 70 in any suitable manner. The heat exchanger 80 can be formed from any suitable material including, but not limited to, stainless steel.

During operation, a flow of hot compressed air can be supplied to the anti-ice valve 54 for selective delivery to a forward portion 40 of the nacelle 20. A portion of the flow of hot compressed air can be diverted upstream of the anti-ice valve 54 to form a flow of muscle air. Such muscle air can be introduced to the servo housing 70 via the muscle air inlet 74. The flow of muscle air can be passed through the heat exchanger 80. Cooling air is also flowed through the heat exchanger 80 to extract heat from the flow of muscle air. More specifically, the cooling airstream passing through the cooling air passage 84 provides for convection heat transfer from circulating muscle air 82 to the airstream in the cooling air passage 84 via the heat transfer surfaces 90 to create a lower temperature muscle air stream. The flow of cooled muscle air can then be provided to any suitable portions of the anti-ice valve 54 to control its operation. For example, cooled muscle air can be provided to the valve actuator 66 (FIG. 3) from the servo controller 64 (FIG. 3) to control operation of the valve element 56 (FIG. 3).

Figure 6:
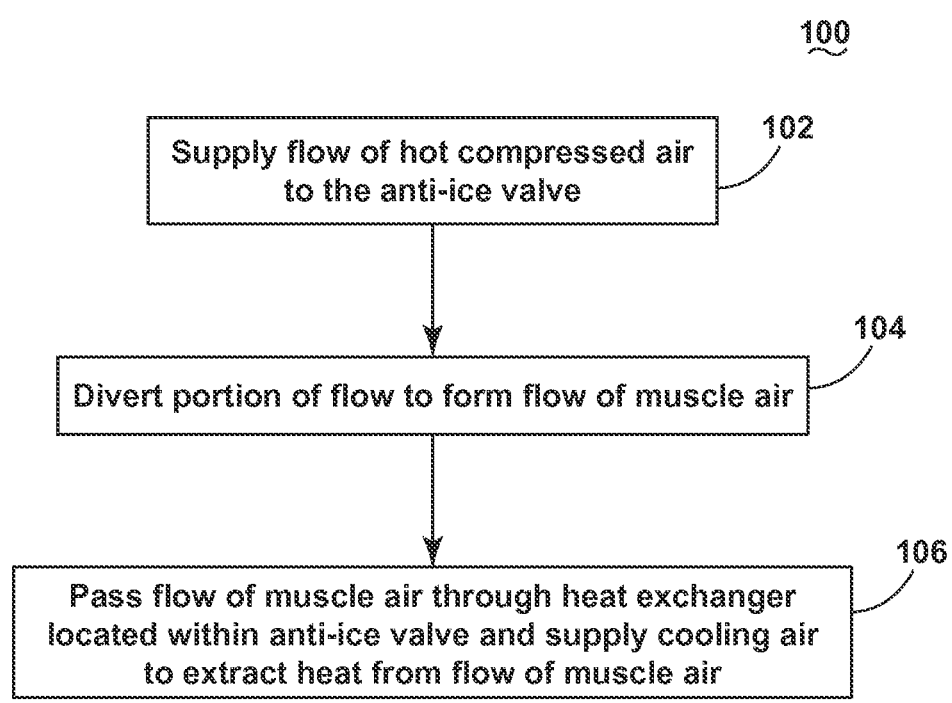
FIG. 6 is a flowchart showing a method of operating an anti-ice valve according to an embodiment of the invention.

In this manner, the previously described anti-ice valve assembly 50 can be used to implement one or more embodiments of a method of the invention. For example, FIG. 6 illustrates a flow chart of a method 100 of operating an anti-ice valve, such as the anti-ice valve 54. The method 100 begins at 102 by supplying a flow of hot compressed air to the anti-ice valve, diverting a portion of the flow of hot compressed air to form a flow of muscle air at 104, and passing the flow of muscle air through a compact heat exchanger having dense finned surfaces located within a servo housing of the anti-ice valve while supplying cooling air to a portion of the compact heat exchanger that is fluidly separate from the flow of muscle air to extract heat from the flow of muscle air to define a flow of cooled muscle air at 106. The sequence depicted is for illustrative purposes only and is not meant to limit the method 100 in any way as it is understood that the portions of the method may proceed in a different logical order, additional or intervening portions may be included, or described portions of the method may be divided into multiple portions, without detracting from embodiments of the invention. For example, the flow of cooled muscle air can be utilized in an additional step to operate a portion of the anti-ice valve.

The embodiments described above provide for a variety of benefits including that a valve assembly having an integral heat exchanger can be provided and the heat exchanger can be closest to the point of use and prior to a first component within the bleed air valve. The above-described embodiments provide for muscle air cooling while not requiring an additional external cooling device. By providing the cooling function within the valve, system weight and packaging volume improvements can be attained. By reducing the muscle air temperature, the life of seals, diaphragms and other internal components can be increased. By ensuring the functionality of these internal components, the valve reliability and component life will be improved. The above-described embodiments can also result in a cost reduction as the need to purchase a separate heat exchanger would be eliminated. Another benefit is reducing overall valve complexity by eliminating multiple parts and assemblies, which results in system simplification and improved functionality as well as simplified installation.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bleed air valve assembly, comprising:
   a bleed air valve having a housing and a valve element configured to control a flow of hot bleed air, at a first temperature, through the housing, wherein the housing includes a servo housing forming a portion of a pneumatic servo controller, and a separate valve element housing;
   a muscle air passage extending through the servo housing;
   a cooling air passage extending through the servo housing, wherein a cooling air is at a second temperature that is less than the first temperature; and
   a heat exchanger located within the servo housing and having heat transfer surfaces in thermal communication with the muscle air passage and the cooling air passage, wherein heat is transferred from muscle air within the muscle air passage to cooling air in the cooling air passage by the heat transfer surfaces to effect a cooling of the muscle air, and define a third temperature muscle air stream, wherein the third temperature is less than the first temperature and greater than the second temperature, wherein the servo housing defines a cavity that houses the heat exchanger, and wherein the cavity is formed at least by a first wall of the servo housing extending from a second wall of the servo housing to a third wall of the servo housing, the second and third walls being horizontal walls.

2. The bleed air valve assembly of claim 1 wherein the muscle air passage includes multiple passages forming a muscle air circuit and the cooling air passage includes multiple passages forming a cooling air circuit.

3. The bleed air valve assembly of claim 1 wherein the heat exchanger is integrally formed with the servo housing.

4. The bleed air valve assembly of claim 1 wherein the servo housing and valve element housing are spaced apart from each other.

5. The bleed air valve assembly of claim 1, further comprising a muscle air outlet fluidly coupling the servo housing to the valve element housing such that muscle bleed air is provided to the valve element housing through the muscle air outlet.

6. The bleed air valve assembly of claim 1 wherein the heat exchanger is a multi-pass heat exchanger.

7. The bleed air valve assembly of claim 1 wherein the heat exchanger is a compact heat exchanger having dense finned surfaces.

8. A gas turbine engine comprising:
   an engine core having an inner housing containing a fan assembly, a compressor section, a combustion section, and a turbine section;
   a nacelle anti-icing system configured to tap compressed air from the engine core to a portion of a nacelle to define a flow of hot bleed air, wherein the hot bleed air is a first temperature; and
   an anti-ice valve assembly comprising:
   a valve element housing defining a flow path;
      a valve element disposed in the flow path configured to control the flow of hot bleed air to the nacelle; and
      a servo controller comprising:
         a servo housing forming a portion of the servo controller;
         a muscle air passage extending through the servo housing and fluidly coupled to the flow of hot bleed air;
         a cooling air passage extending through the servo housing, wherein a cooling air is at a second temperature that is less than the first temperature; and
         a heat exchanger located within the servo housing, and having heat transfer surfaces in thermal communication with the muscle air passage and the cooling air passage and wherein heat is transferred from muscle air within the muscle air passage to cooling air in the cooling air passage by the heat transfer surfaces to effect a cooling of the muscle air and define a third temperature muscle air stream, wherein the third temperature is less than the first temperature and greater than the second temperature, wherein the servo housing defines a cavity that houses the heat exchanger, and wherein the cavity is formed at least by a first wall of the servo housing extending from a second wall of the servo housing to a third wall of the servo housing, the second and third walls being horizontal walls.

9. The gas turbine engine of claim 8 wherein the muscle air passage includes multiple passages forming a muscle air circuit and the cooling air passage includes multiple passages forming a cooling air circuit.

10. The gas turbine engine of claim 8 wherein the heat exchanger is integrally formed with the servo housing.

11. The gas turbine engine of claim 8 wherein the servo housing and valve housing are spaced apart from each other.

12. The gas turbine engine of claim 8 wherein the heat exchanger is a multi-pass heat exchanger.

13. The gas turbine engine of claim 8 wherein the heat exchanger is a compact heat exchanger having dense finned surfaces.

14. The gas turbine engine of claim 8 wherein the cooling air passage is fluidly coupled to the fan assembly of the engine core.

15. The gas turbine engine of claim 8 wherein the compressed air is tapped from the turbine section of the engine core.

16. The gas turbine engine of claim 8 wherein the servo controller controls the valve element and regulates the pressure of the bleed air through the flow path.

17. A method of operating an anti-ice valve, the method comprising:
   supplying a flow of hot compressed air to the anti-ice valve;
   diverting a portion of the flow of hot compressed air to form a flow of muscle air; and
   passing the flow of muscle air through a compact heat exchanger having dense finned surfaces, while supplying cooling air to a portion of the compact heat exchanger that is fluidly separate from the flow of muscle air to extract heat from the flow of muscle air to define a flow of cooled muscle air;
   wherein the compact heat exchanger is located within a servo housing of the anti-ice valve, the servo housing forming a portion of a pneumatic servo controller, wherein the servo housing defines a cavity that houses the heat exchanger, the dense finned surfaces being inside the cavity, and wherein the cavity is formed at least by a first wall of the servo housing extending from a second wall of the servo housing to a third wall of the servo housing, the second and third walls being horizontal walls.

18. The method of claim 17, further comprising utilizing the flow of cooled muscle air to operate a portion of the anti-ice valve.

19. The method of claim 17 wherein diverting the portion of the flow of hot compressed air includes diverting the portion upstream of the anti-ice valve.

\* \* \* \* \*